(12) United States Patent
Ho

(10) Patent No.: US 6,439,956 B1
(45) Date of Patent: Aug. 27, 2002

(54) RC CAR DEVICE

(75) Inventor: Patrick Tze Man Ho, Kwai Chung (HK)

(73) Assignee: Interact Accessories, Inc., Hunt Valley, MD (US)

( * ) Notice: Subject to any disclaimer, the term of this patent is extended or adjusted under 35 U.S.C. 154(b) by 31 days.

(21) Appl. No.: 09/709,432

(22) Filed: Nov. 13, 2000

(51) Int. Cl.⁷ .............................................. A63H 30/00
(52) U.S. Cl. ........................ 446/454; 446/91; 446/43; 463/39; 463/43
(58) Field of Search .................. 446/454, 456, 446/43, 91, 93; 434/365, 393; 463/39, 43, 44, 45

(56) References Cited

U.S. PATENT DOCUMENTS

| | | | |
|---|---|---|---|
| 4,080,602 A | | 3/1978 | Hattori et al. |
| 4,112,615 A | | 9/1978 | Ishimoto |
| 4,166,338 A | * | 9/1979 | Asano ........................ 446/456 |
| 4,180,805 A | * | 12/1979 | Burson ....................... 345/161 |
| 4,334,221 A | * | 6/1982 | Rosenhagen et al. ....... 180/167 |
| 4,349,986 A | | 9/1982 | Tsukuda |
| 4,654,659 A | | 3/1987 | Kubo |
| 4,712,184 A | * | 12/1987 | Haugerud .................... 377/16 |
| 5,184,830 A | * | 2/1993 | Okada et al. ................ 463/29 |
| 5,441,223 A | * | 8/1995 | Young et al. ................ 104/300 |
| 5,552,799 A | | 9/1996 | Hashiguchi |
| 5,556,108 A | | 9/1996 | Nagano et al. |
| 5,596,319 A | * | 1/1997 | Spry .......................... 180/167 |
| 5,618,045 A | | 4/1997 | Kagan et al. |
| 5,646,629 A | | 7/1997 | Loomis et al. |
| 5,697,829 A | | 12/1997 | Chainani et al. |
| RE35,786 E | * | 5/1998 | Ohara .......................... 463/44 |
| 5,766,077 A | * | 6/1998 | Hongo ................... 273/148 B |
| 5,806,849 A | | 9/1998 | Rutkowski |
| 5,888,135 A | | 3/1999 | Barton et al. |
| 5,926,438 A | | 7/1999 | Saito |
| 6,083,104 A | * | 7/2000 | Choi .......................... 446/436 |
| 6,293,798 B1 | * | 9/2001 | Boyle et al. .................. 431/29 |

* cited by examiner

Primary Examiner—Jacob K. Ackun
Assistant Examiner—Bena B. Miller
(74) Attorney, Agent, or Firm—Fulbright & Jaworski LLP

(57) ABSTRACT

A transmitter together with appropriate software are configured in the shape and form of a remote control unit for use with a handheld game player device. The transmitter may use a conventional radio frequency link to transmit commands to a radio controlled device such as a toy car. The remote control unit, consisting of the transmitter and a game cartridge, is inserted into the game device so that the game player device provides control input and display functionalities to and for the remote control unit. The game player may support synthesis, simulation and testing of a route to be traversed by the radio controlled device.

32 Claims, 7 Drawing Sheets

RC CAR DEVICE

BACKGROUND OF THE INVENTION

1. Field of the Invention

The present invention relates to handheld electronic games and, more particularly, to devices that are controllable using a handheld game player device.

2. Description of the Related Technology

A variety of radio controlled, or remote controlled (RC), devices are known in the art. RC toys are among the most popular RC devices. Remotely controlled toy cars, boats and planes are very popular with children and other enthusiasts because they allow the user to directly control and effect the action and movement of the toy. Such toys are typically controlled by use of a dedicated handheld controller that broadcasts radio signals (which correspond to the user's input) to a radio receiver part of the toy which then implements the commands. Battery driven electrical motors and servos typically provide propulsion to move the toy and carry out other commands. One drawback of RC toys is that the controller and toy are an inseparable unit and the controller cannot be used for any purpose other than operating the specific intended toy. A lost controller may render the RC toy useless absent replacing the dedicated controller.

Another drawback of RC toys is that the design or configuration of the toy's body is not readily interchangeable. This happenstance heightens the possibility that a user, particularly a child, will lose interest in playing with the toy. For example, in today's pop culture, an RC toy configured to resemble the Batmobile or Bat Plane may become quickly obsolete or out of vogue by the next blockbuster fad, taking away from the user's enjoyment of playing with the obsolete looking RC toy.

Still yet another drawback of RC toy devices is that typical units require the user to continuously interact with the controller to coordinate the toy's movement to keep the toy on course and avoid crashes or other stoppages in play. Continuous attention to the controller and the toy to monitor direction and speed has proven difficult for many users who lack the necessary dexterity to synchronize the required commands. For these users, a set of pre-programmed commands or pre-programmable routes entered or selected by the user may be preferable.

Another drawback with RC toy controllers is the lack of a user interface-display. A user interface-display which provides or creates game conditions (i.e., display of vehicle speed, direction, obstacles, fuel levels, etc.) may add to the user's enjoyment of operating the toy by adding an additional dimension or challenge to mastering the toy. Such a display may also allow the toy to serve as a means of competition between multiple users by, for example, keeping track of high scores or best times.

A popular user interface-display in use today is the liquid crystal display (LCD) panel on a handheld game machine or "player". Such a device is described for example, in U.S. Pat. No. 5,184,830 of Okida et al., which is hereby incorporated by reference in its entirety. Typically, handheld game player systems are packaged and sold in two components: a main body (host display unit) comprising a handheld game player device and an interchangeable game cartridge unit. Typical handheld game players are operated with both thumbs of a user interacting with control keys on the game player in response to game images displayed on the LCD panel. The popularity of these handheld game systems has sky-rocketed in recent years because they may be used for a variety of games by simply inserting different game cartridges into the game player. Providing use with a variety of games, and continually developing new games, prevents the device from becoming tiresome or monotonous and greatly increases the life-span of the game player system with the consuming public.

One drawback of prior art handheld game player systems is that the user's sole interaction is based on little more than what is displayed within the parameters of the LCD panel. Up until now, however, no one has attempted to use a handheld game player for playing a game outside the parameters and confines of the LCD user interface-display; all of the prior art devices require the user to react to the development of the game as it unfolds on the LCD panel alone.

U.S. Pat. No. 5,926,438 discloses a handheld LCD game machine capable of adaptation to a fish finder by insertion of a game cartridge having a cable connected to an ultrasonic sensor and transmitter which interface with the host game player unit. The units display the topography of the water bottom and any fish in the water on the LCD panel. Not only does this system lack remote control or programmable features, but this system also forces the user to direct his or her attention exclusively to monitoring the display on the LCD panel.

The foregoing underscores some of the problems associated with conventional RC toy devices and handheld game players. Furthermore, the foregoing highlights the need for an RC toy device with a changeable body design. Accordingly, there is a need in the art for an improved system for remote control of an RC toy or other robotic type device.

SUMMARY OF THE INVENTION

It is therefore an object of the present invention to provide an RC toy device that is controllable by a handheld game player device. The RC toy is adapted to be directly controlled, and/or to follow preprogrammed instructions, based on a user's input of commands via a handheld game player, wherein the LCD panel of the game player preferably provides a user with information regarding the game's progress.

It is another object of the present invention to provide an RC toy device including a control unit and a remotely controlled device that is "alternatively controllable", meaning capable of both direct real time control (wherein the toy immediately follows the instructions of a player operating a handheld game player device) and, alternatively, pre-programmed control (wherein a user enters a series of commands or a series of desired actions resulting in the generation of a series of commands stored in the memory of the game player device and the commands are selectively broadcast to the toy at a later time).

It is another object of the present invention to provide an RC toy device which is alternatively controllable by a handheld game player wherein an integral LCD panel provides, as appropriate, either a game display coordinated to show the development and progression of the game in response to a user's direct control or, alternatively, a display of a user's preprogrammed route (and/or other preprogrammed commands) and, the RC toy's progress with respect to the preprogrammed route (and/or other commands).

It is a related object of this invention to provide a remote control unit for mating with a handheld game player, wherein the remote control unit has a game cartridge portion housing a memory storing software capable of accepting user inputted commands and communicating the commands to an associated transmitter for broadcasting the commands to a remotely controllable object such as an RC toy.

It is also a related object of the invention to provide software capable of operating a remotely controllable object such as an RC toy or other remotely controllable object, by direct control in response to a user's real time inputs or by broadcasting preprogrammed commands previously entered by the user.

It is a further related object of this invention to provide software capable of direct or preprogrammed control of the RC toy and capable of displaying real time development of the game on the LCD panel of a handheld game player or capable of displaying a preprogrammed route and/or other commands and, the object's progress with respect to the preprogrammed route and/or other commands.

It is yet another related object of this invention to provide a method of preprogramming the operation of an RC toy device using a handheld game player.

Another object of the present invention is to provide a wireless remote control system for controlling an RC toy device incorporating any and all the aforementioned objects of the invention wherein the RC toy device comprises a motorized toy vehicle body adapted to receive interchangeable body work, such as body parts, shell, or whole body casings, which allows the toy to be configured to resemble miniature versions of different models and types of vehicles.

These and other objects of the present invention may be satisfied by an RC toy device comprising:

an RC toy unit having a toy chassis, a receiver unit for receiving commands from a remote transmitter, and a power unit for powering the toy unit; and an RC control unit comprising a controller adapted for receiving manual inputs representing a user's commands, and a remote control unit comprising an transmitter and a game cartridge which stored program instructions executable by the controller to receive, communicate and/or display commands and/or display game development.

Further objects of the present invention may be satisfied by an RC toy device as described above wherein the software is adapted to provide for both direct control and preprogrammed control of remotely controllable device such as an RC toy and further adapted to provide real time development of an associated protocol such as a game on the LCD panel and depict the device's progress with respect to programmed commands.

Additional objects of the invention may be satisfied by an RC toy device as described above wherein the toy chasis or frame is adapted to receive interchangeable body work or body casings or shell.

In accordance with one aspect of the present invention, the RC toy device comprises an RC toy car having a motorized platform and a control unit. In accordance with this aspect of the invention, a presently preferred motorized platform comprises a miniature vehicle such as a car, a power unit and an receiver unit. The miniature car according to this aspect of the invention comprises a toy car body comprising a frame for housing the receiver unit and the power unit.

In accordance with another aspect of the invention, the transmitter and receiver operate in the radio, microwave, visible light or infrared bands or employ some other wireless mode of communications o as to establish a wireless channel for transmission of control signals from the transmitter to the receiver. Alternatively, the transmitter may be connected to the receiver by one or more cables or wires. Still further, a communications channel established between the remote control unit and RC toy may be bidirectional to provide two-way communications therebetween. The "reverse" channel from the RC toy to the game player via the remote control unit may support such functions as control feedback, position reporting, video imaging from an RC toy mounted camera, etc.

The frame according to this aspect of the invention includes rotatably mounted wheels, for propelling the toy car forward and backward, and controlling a left-right direction of movement of the toy. The wheels should be powered by a motor of the power unit and should also be remotely controlled.

The power unit according to this aspect of the invention is preferably a rechargeable battery pack which powers a steering mechanism, preferably in the form of one or more servo motors for turning at least one set of the car's wheels to the left and right and which further powers a drive motor for rotating at least one set of the car's wheels in forward and reverse directions. The power unit preferably also powers the RF receiver unit of the car unit. Separate batteries may be used to power (i) the drive motor used to propel the car and (ii) the steering mechanism and receiver. A presently preferred power unit comprises a rechargeable battery pack having an on/off switch for preserving the batteries.

As will be appreciated by one of ordinary skill in the art, there are several known ways to mount and power wheels for providing remotely controlled forward, rearward, left and right vehicle movement, and all should be equally viewed as within the scope of the invention.

The receiver unit according to this aspect of the invention preferably comprises a radio receiver for receiving, detecting, demodulating, decoding and implementing commands from a radio transmitter, and an antenna for receiving the command signals from the radio transmitter. Typical radio frequencies ("RF") used by such radios include the 27 MHz and 72–75 MHz bands.

In accordance with another advantageous feature of the invention, the frame of the miniature car is also preferably adapted to receive interchangeable body work. By "interchangeable body work" it is intended that the physical appearance of the toy car can be altered by removing existing body work defining the car's appearance and replacing it with new body work of a different shape, style, color or configuration. The term "interchangeable body work" should be understood to include all physical alterations of the car's outward appearance including such methods as physically removing a complete body casing or shell and replacing it with another one, or removing or adding different body parts to a body casing or the car's frame. As will be appreciated by one of ordinary skill in the art, interchangeable body work allows a user to transform a basic car frame of the toy substrate into, for example, an "Indy" race car by attaching the appropriate body parts or a body casing, and subsequently transform it into a "Bat-Mobile" by removing the Indy car body work and attaching the appropriate Bat-Mobile body work.

Also, in accordance with the aforementioned toy car aspect of the invention, a presently preferred control unit comprises a handheld game player system including a handheld game player with a remote control unit, the latter including a game cartridge and transmitter unit. The controller according to this aspect of the invention functions as a user interface adapted for receiving a user's commands. Suitable handheld game players for use with the present invention include those sold by Nintendo® under the trade names Game Boy®, Game Boy Pocket®, Game Boy Color®, and like device, sold by other companies.

Typical handheld game players comprise a host unit with a front surface having an LCD panel for showing the development of a game. A positional input device such as a cruciform key generally controls the direction of a game piece displayed on the LCD display. Two button-shaped keys are also provided and generally command various movements or conditions for the game piece. A start switch and select switch are also provided, although these keys may be adapted by appropriate programming to perform other functions. Preferably, the front portion also has a speaker for generating sound effects that correspond with events unfolding as the game develops.

The sides of the handheld game player typically house a luminance control for the LCD panel and a volume control for the speaker audio level. The back side of the game player typically defines a cartridge receptacle for receiving a game cartridge.

The remote control unit component of the remote control unit according to the aforementioned aspect of the invention preferably comprises a game cartridge and a transmitter unit having an antenna.

In accordance with this aspect of the invention, the remote control unit preferably comprises an radio transmitter for transmitting commands to the radio receiver of the RC toy car or other remote control device. As will be appreciated by one of ordinary skill in the art, numerous types of radio transmitters, and transmitting and modulation techniques are known in the art and each should be equally understood to be within the scope of the present invention. The invention should not be understood to be limited by the specific radio transmitter or transmitting technique used. Further, other forms of wireless and wired remote control are also considered to be within the scope of the invention unless otherwise specifically included by the language of the appended claims.

According to the invention, it is also preferable to have a suitable antenna for use by the radio transmitter for radiating command transmissions to the car's radio receiver. According to a preferred embodiment for use with a typical toy RC device, the antenna may be between one and three feet long and constructed to be foldable or retractable for safe storage or may be a flexible, coiled whip or loop antenna.

The game cartridge portion of the remote control unit is preferably constructed to be matable with the game player via the cartridge receptacle. The game cartridge portion preferably houses the software that interfaces with the host unit and the RC car to allow the game player to operate as a remote controller of the RC car. The game cartridge preferably interfaces with the transmitter by appropriate wired connections or by one or more mating electrical connections. One embodiment of the invention includes an edge connector along the "top" of an otherwise conventional game cartridge, opposite the end inserted into the game player, for connecting the game cartridge to the transmitter. An alternate arrangement provides capacitive, inductive, or other sensors in the transmitter module for passively detecting and decoding signals generated by the game cartridge and, in response, transmitting appropriate command signals to the RC device, e.g., toy car. Still an alternate arrangement uses an available data port, such as the "Game Boy" Link Port to communicate with and send control messages to the transmitter. In this case, the "interface" between the game cartridge and the transmitter is through the game player even though the cartridge and transmitter may be physically coupled. This arrangement avoids the need to modify the conventional game cartridge package but requires the provision of an electrical connection between the transmitter and data port.

Preferably, the software provides for at least three operational modes. According to an advantageous feature of the invention, the software displays a main menu on the LCD panel from which a user can select one of the following play modes: Direct Control, Program Route, or Load Route.

According to this aspect of the invention, the "Direct Control" mode provides for real time remote operation of the car. In this mode, the LCD panel preferably displays a simulated dash board and/or view through a windshield of a car. The cruciform positioning key allows a user to turn at least one set of the car's wheels and such turns are reflected on the LCD panel's simulated driving display. The two button-shaped keys correspond to commands for forward and rearward rotation of at least one set of the car's tires, respectively, and the car's direction is displayed and simulated on the LCD panel. The start and select keys may correspond to other remote commands for the car, such as a turbo button, power jump, headlights or ejector seat, or alternatively, serve ministerial functions for guiding a user through the various options requiring the user's selection.

The "Program Route" mode according to the invention provides a series of options through which a user is able to enter a route and/or other commands into the memory of the game which may be played-back and carried out at a later time. In this mode, the LCD panel preferably displays a programming menu which lists options for a user to scroll through and select from, such as the options of (a) entering/editing a programmed route, (b) testing the programmed route, (c) scaling the programmed route, (d) saving the programmed route, (e) loading the programmed route, and (f) exiting the programming menu. Selecting any of the options causes the game to provide further menus or options appropriate for the selected function in order to provide a user with the means for carrying out the respective function.

For example, according to this aspect of the invention, if the "editing a route" option is selected, the cursor may be displayed on the LCD panel as a flashing box. In accordance with this feature of the invention, the LCD game player is divided into a grid of equal-sized boxes which may be traversed by the cursor. The direction of the cursor is preferably controlled by the cruciform key. According to this aspect of the invention, when moving the cursor, the user has the option of either "adding a route portion" or "deleting a route portion." The add and delete options may be controlled by pressing the A or B buttons, respectively.

In accordance with this feature of the invention, when the user selects the A button for the first time to add a portion of the route, a flashing shaded box is preferably displayed on the LCD panel to indicate that this is the start position of the route. The start position is where the RC device should begin its journey along the route when commanded to carry out the preprogrammed route.

After the start position box is selected to be added as a route portion, the cursor may be moved to any of the adjacent boxes to create the next step in the route. Accordingly, one of the adjacent boxes must be selected for adding to the route in order to assure a continuous route. As boxes are added to the route, they appear as shaded boxes. Thus, the route will be displayed as a series of contiguous shaded boxes traveling in a pattern, or route, around the LCD panel's grid of boxes.

According to this feature of the invention, the user may edit the route by moving the cursor to one of the shaded boxes and pressing the "delete a route" button, or B button, and moving the cursor to a different box and pressing the "add a route portion" button, or A button. As will be appreciated by one of ordinary skill in the art, the route should at all times remain contiguous or be made contiguous prior to storage and/or use.

In operation, a cursor represented by a flashing shaded box or other icon displays the starting step or position. Thereafter, when a box is selected as being added to the route, the corresponding box will be shaded or bolded and the next set of selectable boxes adjacent the selected box will be displayed as a series of empty but highlighted boxes indicating that they, and only they, may be selected by the user for the next step in the route (because the user must select one of the contiguous boxes to ensure there are no gaps in route).

Once the user completes a desired route, the exit button on the front face of the host unit may be actuated to exit the "editing a route" option.

Also, according to this aspect of the invention, one of the display options is preferably "testing the programmed route," through which the user's entered route may be tested. During testing, the device should not accept any key input except a single button, such as the B button, which should stop the testing immediately. Testing preferably allows the user to view the RC device's progress with respect to the route so any needed editing of the route may be performed before the route is saved in the game's memory. When testing is finished, the user should be able to press the "select" button, or any other suitable button, to exit the testing option.

According to another aspect of the invention, a simulation function provides for a simulated navigation of a partial or completed course to identify and display predicted RC device progress including speed and deviations from route resulting from physical factors and constraints such as loss of traction, deceleration/stopping distances, spin-outs, etc. This function may be used to determine if a particular RC device is predicted to be capable of successfully navigating a course and to allow modification of the course and/or command sequences to be transmitted to the RC device (e.g., acceleration, braking and steering commands) to maximize performance over the course.

The option of "scaling of the programmed route" according to another aspect of the invention allows the user to alter the size, or scale, of the route. In other words, change the area, or distance, traversed by a single box in the LCD panel's grid. When this option is selected, it is preferable that the current scale value be indicated on the game player. Thus, the user is able to scale the value as desired in view of the current reference value. For example, the user may press the cruciform key in an up direction to increase the scale value, or press the cruciform key in a down direction to decrease the scale value. Thereafter, an RC device following the route should travel the route according to the new scale value. Preferably, once the preprogrammed route is scaled to a desired value, the route can be saved at that scale value in game cartridge memory. Alternatively, the route may be stored independent of scale, a scale factor being stored separately and applied upon retrieval and display of the stored route.

Furthermore, in accordance with this aspect of the invention, the "saving a preprogrammed route" option should allow a user to save a preprogrammed route and, preferably, allow the user to save the route under a user-identified route name (alphanumeric or otherwise) which will allow the user to select the route on a basis of the user-identified name at a later time. Thus, according to this aspect of the invention, the "opening of a preprogrammed route" option allows the user to open one of the saved routes by entering the correct user-identified name which was entered during the save option, or alternatively, by choosing the route off a "pick list" of saved routes.

According to another aspect of the invention, there is an "exiting the preprogramming menu" option which allows the user to exit the "Program Route" mode, and preferably, allows the user to return to the main menu. The user may be prompted to exit upon completion of a complete circuit along the route.

The "Load Route" mode according to an aspect of the invention allows for the preprogrammed remote operation of the RC device. When the "Load Route" mode is selected from the main menu, the LCD screen displays a list of saved (including prestored sample and demonstration) routes from which the user may select the desired preprogrammed route to be loaded and run. In accordance with an advantageous feature of the invention, the user preferably makes a selection by moving a highlighted arrow or bar over the pick list of routes by use of the cruciform key and pressing the "A" button, or any other appropriate button, to select the route to be loaded. When the route is selected, the route pattern is displayed on the LCD panel. Thereafter, the user is able to press a start button to have the game transmit appropriate commands required to navigate the preprogrammed route (e.g., steering and drive commands required to traverse the route) for execution by the RC toy. According to this feature of the invention, pressing the "A" button will start the route, pressing the B button will stop the route, and pressing the select button will exit the "Load Route" mode.

Preferably, as the toy car progresses along the preprogrammed route, the cursor flashes in the appropriate box along the route as it is displayed on the LCD panel. According to this feature of the invention, the cursor tracks the progress of the car based on quantifiable factors, such as knowing or calculating the speed of the vehicle and the size of the route. As will be appreciated by one of ordinary skill in the art, the car's progress around the route may be tracked by other suitable means, e.g., sensors along the route of travel, etc., or may be calculated based on the predicted performance of the car and the command sequences transmitted The cursor may be representative of the type of vehicle represented by the toy car, e.g., sports car, truck, etc.

The invention as described and claimed herein should become evident to a person of ordinary skill in the art given the following enabling description and drawings. The aspects and features of the invention believed to be novel and other elements characteristic of the invention are set forth with particularity in the appended claims. The drawings are for illustration purposes only and are not drawn to scale unless otherwise indicated. The following enabling disclosure is directed to one of ordinary skill in the art and presupposes that those aspects of the invention within the ability of the ordinarily skilled artisan are understood and appreciated.

While the invention will be described and disclosed in connection with certain preferred embodiments and procedures, it is not intended to limit the invention to those specific embodiments and procedures. Rather it is intended to cover all such alternative embodiments and modifications as fall within the spirit and scope of the invention.

DETAILED DESCRIPTION OF THE PREFERRED EMBODIMENTS

Generally, the present invention relates to a remotely controllable device and, in particular, to an remotely piloted vehicle such as an RC toy device capable of being operated by a handheld game player system. Control of the RC toy device is provided by specialized software capable of interfacing with a handheld game player and capable of coordinating communications from the buttons of the host unit, to transmitter, to receiver and power unit of the toy device, while also being able to generate a suitable game progression display on the host unit's LCD panel. The transmitter and receiver maybe wired or wireless (e.g., radio, infrared, etc.).

While the present invention is described in connection with a remote controlled toy car, it will be readily appreciated by one of ordinary skill in the art that the teachings of the present invention can be applied to other RC devices, such as, other RC land vehicles, RC watercraft, or RC air or space craft. The invention is further applicable to other remotely controllable devices such as televisions, VCR's, etc., and to a broad range of devices capable of being controlled or interfaced over a suitable communication link. Accordingly, the invention should not be viewed as being limited by the type of RC device utilized.

Figure 1:
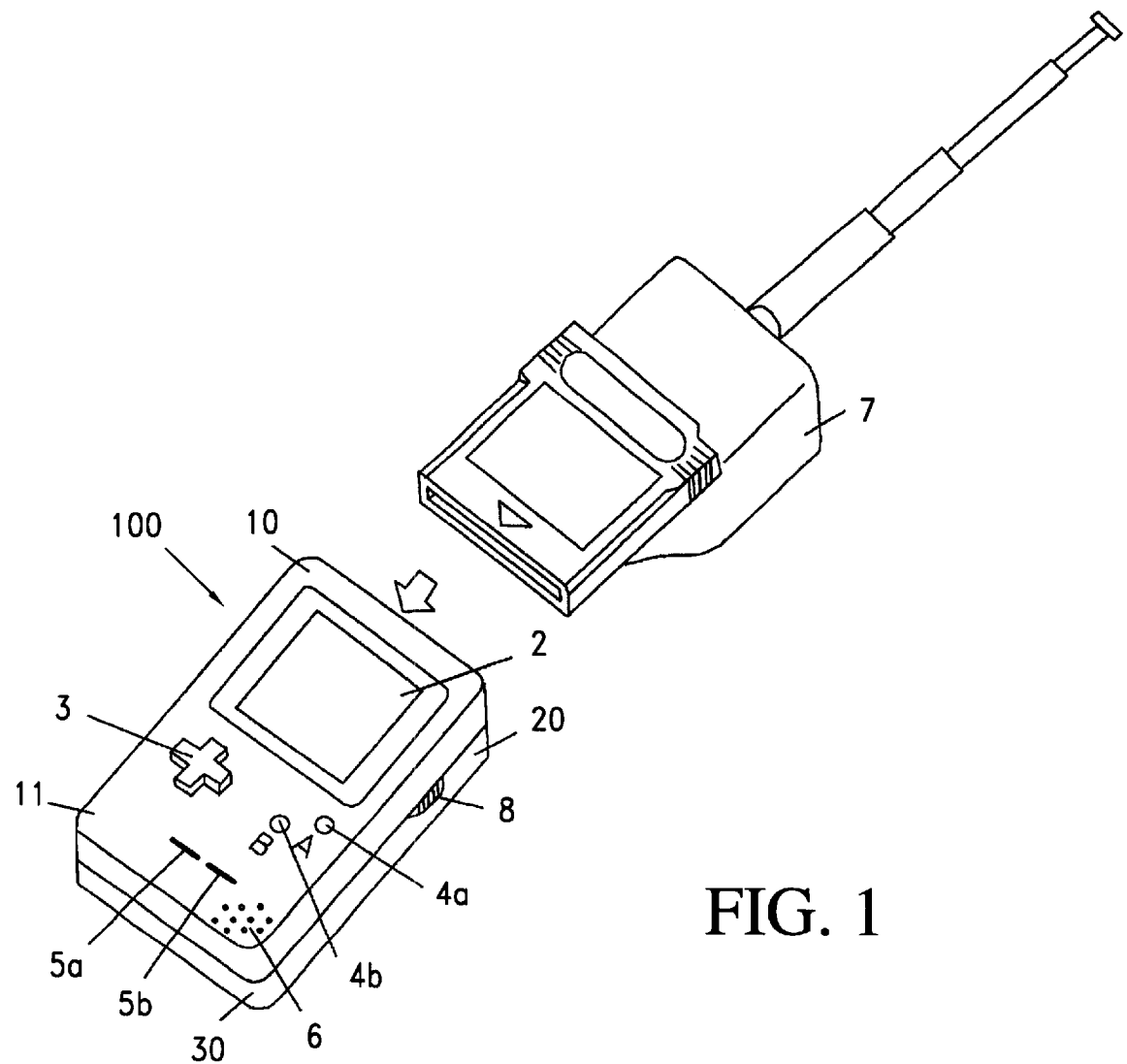
FIG. 1 is an exploded perspective view of a typical LCD game player with a detachable remote control unit according to the invention.

In accordance with a presently preferred embodiment of the invention, a control unit comprises a game player with a remote control unit installed in and/or connected to the game port of the game player. The remote control unit includes a game cartridge with (i) conventional connections to the game player and (ii) appropriate signal interfaces with a transmitter unit. As best depicted in FIG. 1, game player 100 is capable of receiving interchangeable cartridges; in this case, remote control unit 7. Suitable LCD game machines for use with the invention include, but are not limited to, Game Boy®, Game Boy Pocket®, and Game Boy Color®, and like devices. Game player 100 according to this embodiment of the invention has a front surface 10, side surface 20 and back surface 30.

LCD panel 2 is disposed on the front surface 10, and configured to show the development of a game, control status, vehicle position, etc. When the game is manually operated in real time, a cruciform key 3 provides for the shifting direction of a game character within the game as it unfolds on LCD panel 2. Another set of movement keys 4a and 4b instruct various other movements for the character within the game. Also, on front surface 10, start switch 5a and select switch 5b are arranged for receiving user input. The portion of front surface 10 equipped with the aforementioned keys and switches is called the "operating portion" and is depicted generally on FIG. 1 by reference numeral 11. Preferably, also disposed in the operating portion 11 is a speaker 6 for generating audible sound effects corresponding to the development of the game.

The side surface 20 houses a luminescence controller (not shown) for controlling the brightness of the LCD panel 2 and a volume controller 8 for controlling the volume of sounds generated by the speaker 6 in the operating portion 11 of front face 10.

Back surface 30 is configured to define a cartridge receptacle (not shown) for receiving interchangeable remote control unit 7. As will be appreciated by one of ordinary skill in the art, interchangeable remote control unit 7 has a memory storing program code, instructions and data for controlling and displaying a game and transmitting commands via an integral transmitter to a remotely controlled vehicle. A power supply and a power supply switch are omitted from FIG. 1.

Figure 2:
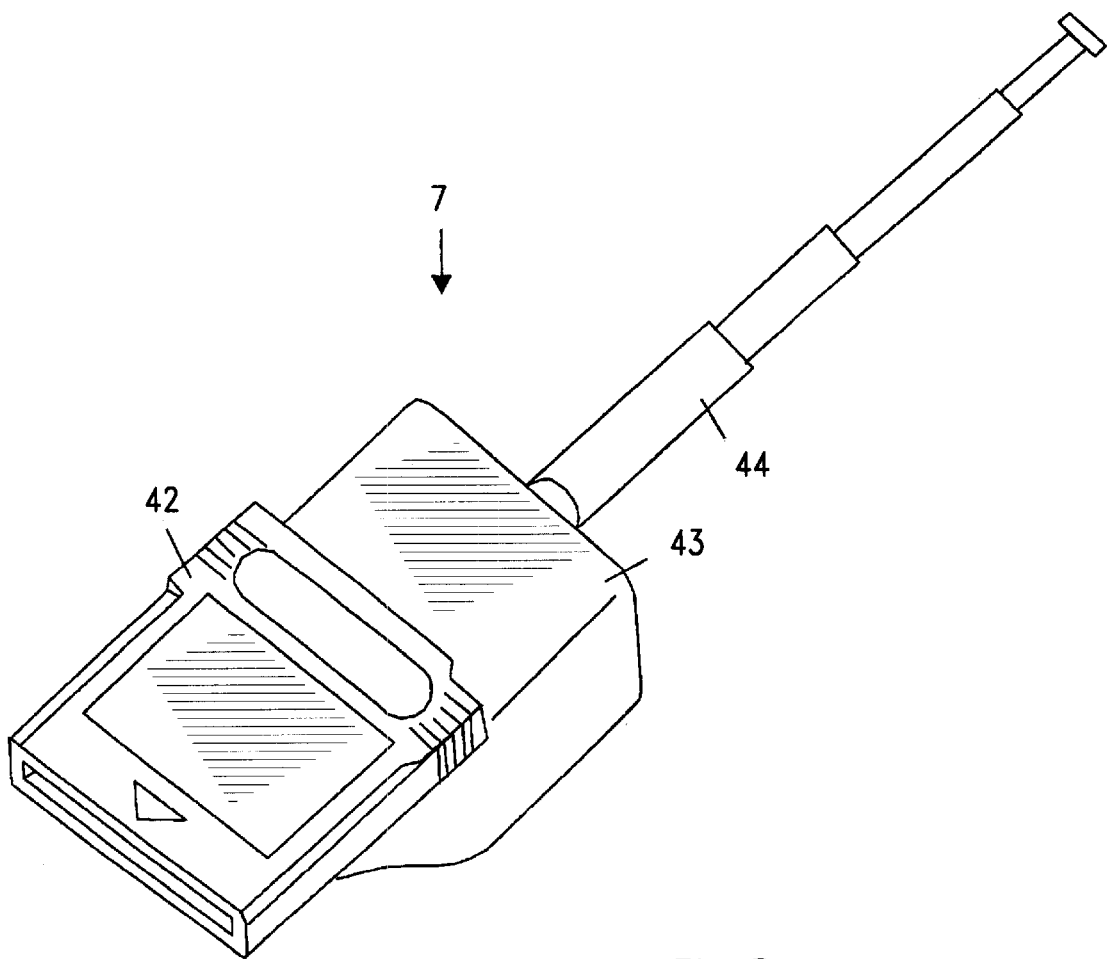
FIG. 2 is a perspective view of an embodiment of a remote control unit according to one embodiment of the invention.

FIG. 2 depicts a remote control unit according to an embodiment of the invention. The game remote control unit 41 comprises an interchangeable game cartridge 42, a transmitter unit 43, and an antenna 44. Game cartridge portion 42 is the same general shape and form as a conventional interchangeable game cartridge capable of being inserted into, and coupling with, the cartridge receptacle of a handheld game player 100. Accordingly, as will be appreciated by one of ordinary skill in the art, game cartridge 42 is preferably equipped with 32-pin edge connector (not shown) for mating with the 32-pin connector (not shown) of the cartridge receptacle of game player 100. In a one piece embodiment of remote control unit 41, game cartridge 42 may be permanently attached and electrically "hardwired" to transmitter 43. Alternatively, game cartridge 42 may be detachable from transmitter 43, communications between the two provided by a suitable electrical connection, inductive, capacitive, or magnetic coupling device, IR transmission, etc. Furthermore, as will be appreciated by one of ordinary skill in the art, the coupling of game player 100 and game cartridge 41 allows the devices to interact with one another and operate as an integral unit.

Figure 3:
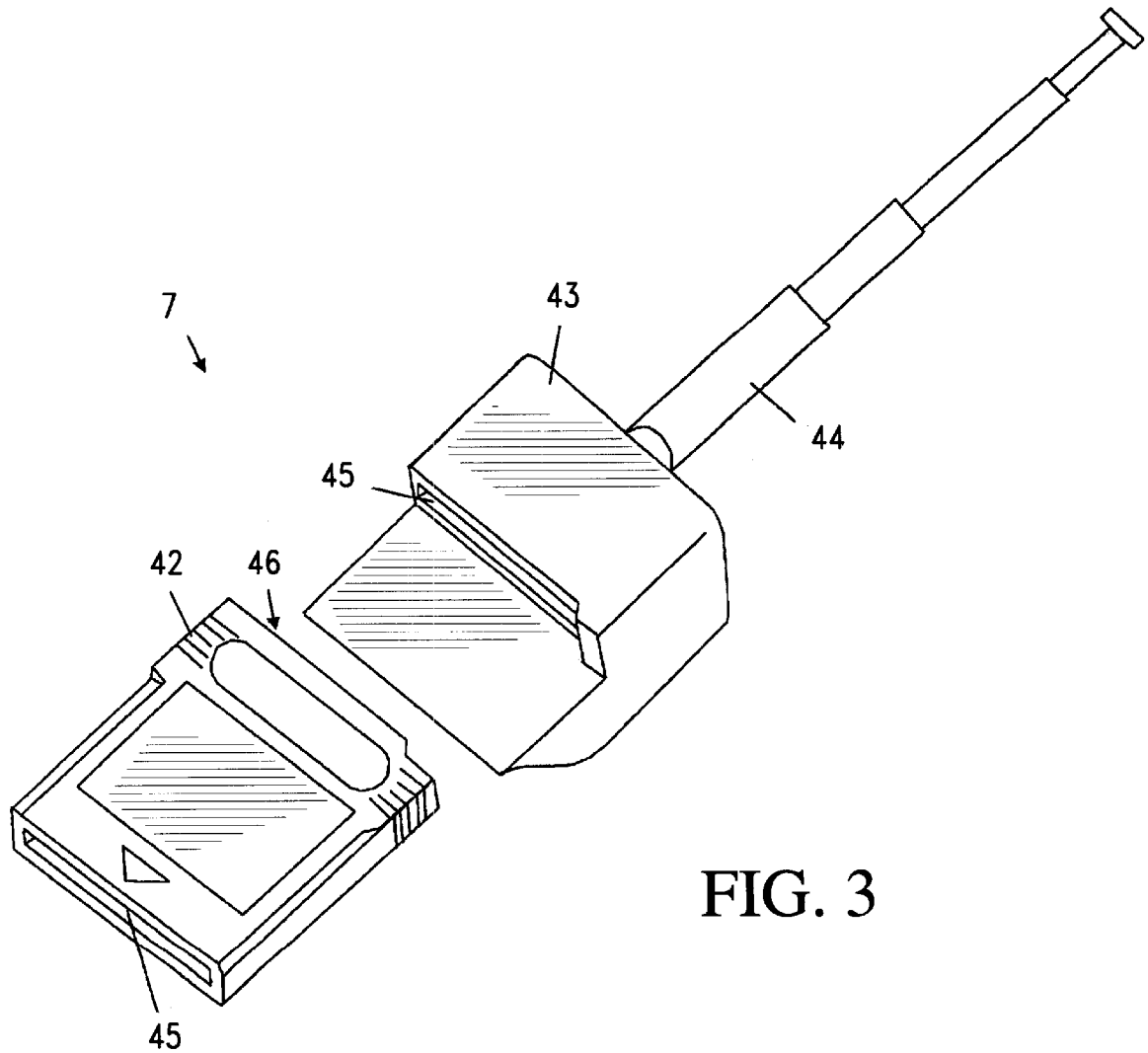
FIG. 3 is an exploded view of a remote control unit including detachable game cartridge and transmitter portions.

FIG. 3 depicts a game cartridge 42 separated from transmitter unit 43. An electrical interface between transmitter unit 43 and game cartridge 42 is provided by respective edge connectors 45 and 46 which mate upon insertion. Mechanical integrity may be provided by the structure of the connectors and/or by the configuration of game cartridge 42 and transmitter unit 43 comprising remote control unit 7. Preferably connector 46 is the same as or similar to the corresponding connector provided by game player 100 for mating with connector 47 of game cartridge 42, and connector 45 is the same as or similar to connector 47.

Figure 4A:
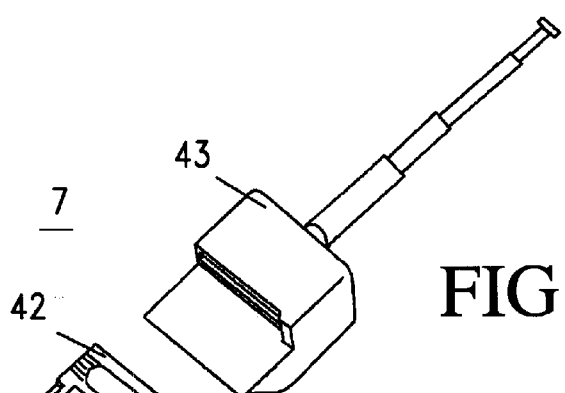
FIGS. 4a, 4b and 4c are exploded views of alternative embodiments of remote control units according to the invention.
Figure 4B:
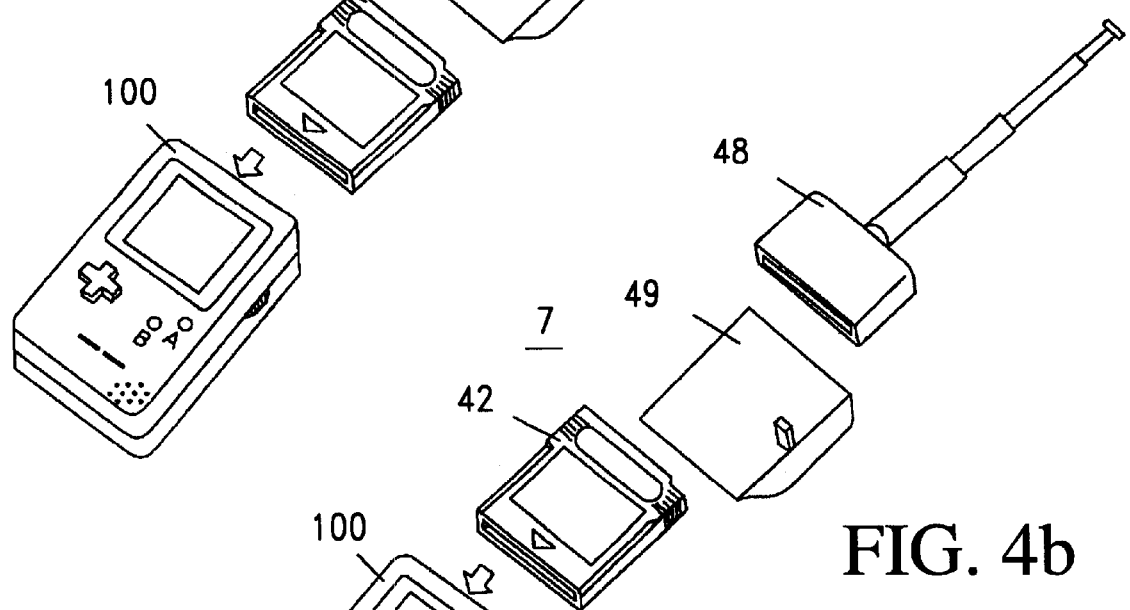
Figure 4C:
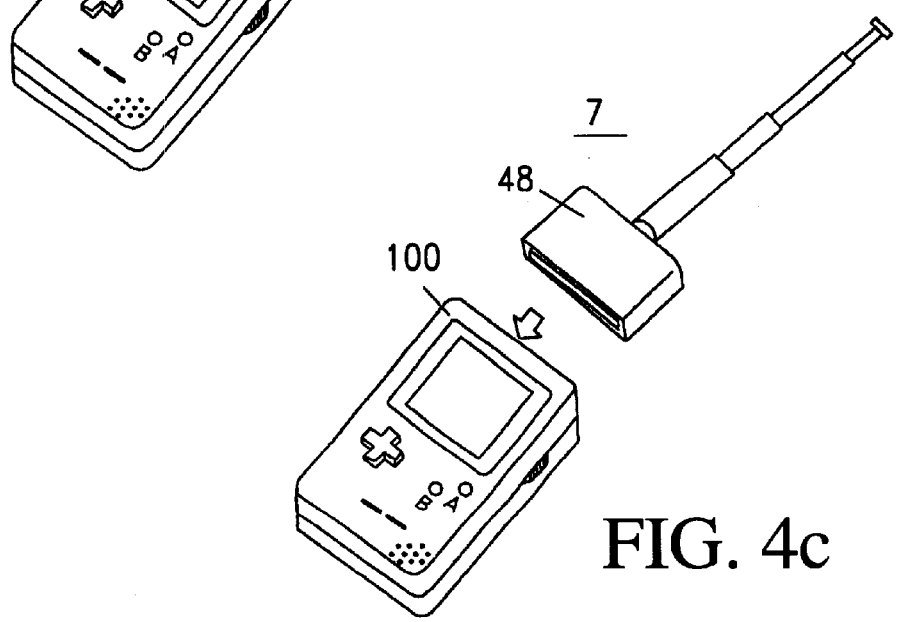

FIGS. 4a–4c depict exploded variations of interchangeable remote control unit 7 as might be assembled and inserted into game player 100. Referring to FIG. 4a, interchangeable remote control unit 7 includes detachable game cartridge 42 and transmitter unit 43. Such a configuration allows for various games resident on game cartridge 42 to be used in combination with alternative wireless and wired transmission systems supported by appropriate transmitter unit 43. For example, a racing game implemented by software resident in game cartridge 42 may be used with selected transmitter units 43 compatible with respective RC device types, transmission frequencies, and/or transmission modes (e.g analog or digital RF, IR, etc.).

FIG. 4b depicts an exploded representation of an interchangeable remote control unit 7 including three main components, detachable game cartridge 42, transmitting portion 48 and base coupling section 49. In this embodiment, base section 49 may include, for example, a rechargeable batteries for powering transmitter unit 48. Thus, a user may have multiple battery packs in the form of base section 49 so that a fully charged unit is available at all times. Further, this configuration provides for use of transmitter unit 48 without game cartridge 42 when appropriate interfaces are available and provided by game player 100. Thus, as depicted in FIG. 4c, transmitter unit 48 may be inserted directly into game player 100 to support applications and/or games not requiring a separate game cartridge 42. For example, the configuration of FIG. 4c may be used as a slave or secondary game playing unit interfacing with a primary game player 100.

Game cartridge 42 of remote control unit 7 preferably includes a memory storage device for storing pre-coded software that includes data and program instructions for the user interface and the game. Furthermore, the program memory is preferably stored in nonvolatile memory (e.g., a masked ROM) of the memory storage device and user saved routes or other commands/inputs are preferably stored in a writable memory, such as a static RAM of memory storage device. As will be appreciated by one of ordinary skill in the art, the static RAM is preferably backed-up by an appropriate internal power source, such as a 3V lithium battery, to maintain memory integrity after the host unit is turned off.

In addition, as will be appreciated by one of ordinary skill in the art, a processing system in the game player 100, includes a microprocessor, memory, and associated logic hardware. The processing system operates electrical data, address, and control lines in a conventional manner in order to interface the elements in the host display with the elements of the game cartridge.

Transmitter unit 43 of remote control unit 7 preferably houses a wired or wireless transmitter (not shown) for communicating operational commands to a remote receiver. As will be appreciated by one of ordinary skill in the art, numerous types of transmitter and transmitting techniques are capable of being adapted for use with the present invention. Accordingly, the invention should not be understood as being limited by the type of transmitter or transmission technique used.

Disposed on transmitter unit 43 is antenna 44 for facilitating the transmission of commands from the transmitter when implemented as an RF device. Preferably, antenna 44 is designed to telescopically protrude for use and retract for safe-keeping. More preferably, antenna 44 is also configured to be adjustable in any desired direction and foldable for ease of storage. Further included within transmitter unit 43 (or base section 49) are batteries for powering the transmitter if sufficient power is not available from host unit 100.

Game cartridge 42 is either permanently or removably connected to transmitter unit 43 by suitable mechanical and electrical connections. In an interchangeable implementation, game cartridge 42 is removable so that game cartridges storing different programs may be used with a single transmitter unit. Likewise, different transmitter units may be used in combination with a particular game cartridge to adapt the game cartridge to the specific remote control requirements of a particular RC toy device (e.g., r.f., infrared, wire, etc.).

Figure 5A:
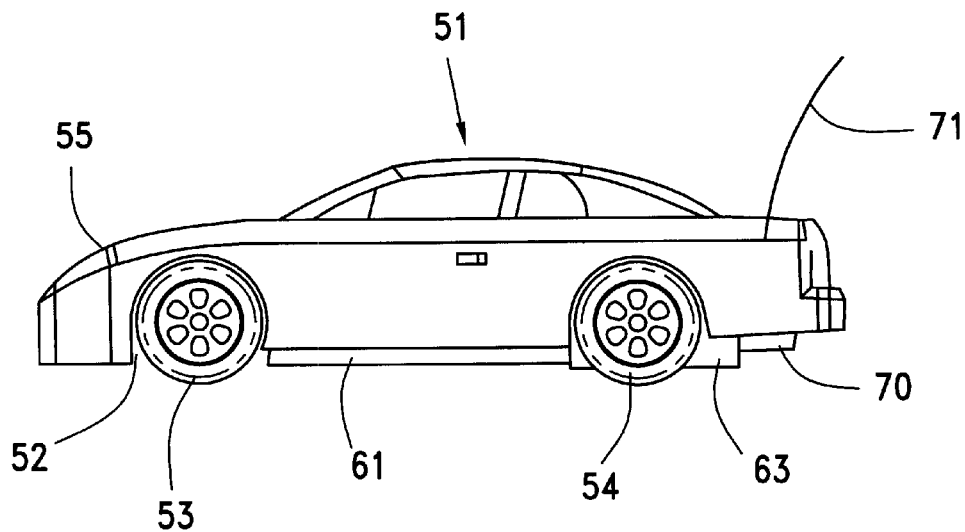
FIG. 5A is an exploded view of a car unit of an RC car device according to one embodiment of the invention.
Figure 5B:
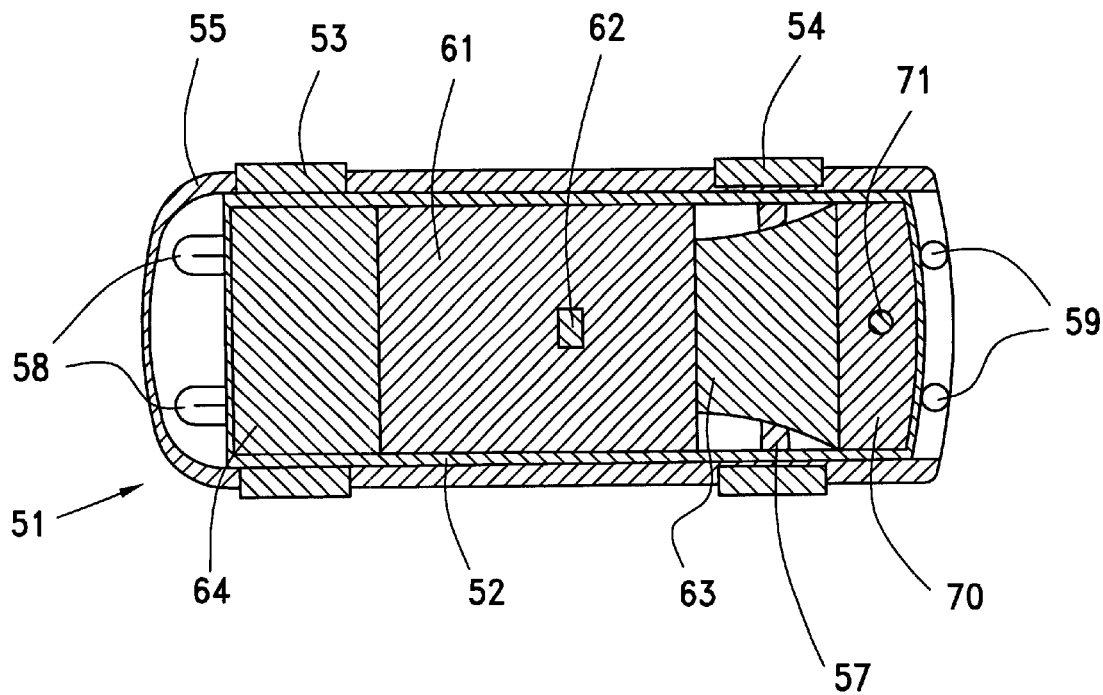
FIG. 5B is a bottom view of the car unit of FIG. 5A taken along line A—A.

In accordance with a presently preferred embodiment, commands are broadcast from the transmitter of the control unit to effectuate the remote control action of a car unit. According to this embodiment of the invention, the car unit comprises a miniature car, a power unit, and an receiver unit. As depicted in FIGS. 5A and 5B, the car unit 50 of an RC toy device according to the invention may comprise a miniature car 51 comprising a frame 52 having front wheels 53 and back wheels 54 mounted thereon. The frame 52 is preferably coupled to body work, such as a body casing 55, to resemble a desired type, model or design of car.

Housed within the frame 52 and body work is a power unit, such as a battery pack 61, for providing power to a motor 63 to power the car unit 50. Power unit 61 and motor 63 rotate back tires 54 via axle 57 in a forward or rearward direction upon receipt and for the direction of a corresponding command. Likewise, power unit 61 with motor 63 are preferably able to turn front wheels 53 to the left or right via steering mechanism 64 upon command using appropriate servo-type motors (not shown). As best depicted on FIG. 5B, power unit 61 is also preferably capable of providing electrical power to headlights 58 and to tail lights 59. Power unit is preferably a rechargeable battery pack 61, and preferably has an on/off switch 62 to save battery power when the RC toy car is not in use.

Also preferably disposed within the chasis or framework of the miniature car 51 is the radio receiver unit 70. Radio receiver unit 70 comprises an RF receiver and appropriate decoding and control circuitry for receiving commands from a radio-type transmitter of the control unit and providing appropriate power and control signals to the various motors and sensors. To aid the reception of commands, the receiver preferably acts in cooperation with antenna 71. Upon receipt of commands from transmitter, receiver unit 70 functions to coordinate with the power unit, peripherals, and mechanized units, to carry out the commands. For example, in response to a user's input of a command to move forward, the receiver preferably communicates to power unit 61 to power the axle 57 to turn rear wheels 54 in the forward direction. As will be appreciated by one of ordinary skill in the art, numerous types of receivers and receiving techniques for carrying out remote commands are capable of being adapted for use with the present invention. Accordingly, the invention should not be understood as being limited by the type of receiver or receiving technique used.

Also, as will be appreciated by one of ordinary skill in the art, there are numerous variations and modifications to the software that may be done without departing from the spirit and scope of the invention. The software program will depend upon such factors as the handheld game player being used, the modes of play desired, the type of RC device, and the desired functions to be performed. Accordingly, as will be appreciated by one of ordinary skill in the art armed with the present specification, the development of software suitable for carrying out the scope and spirit of the intended invention is well within the ability of one of ordinary skill in the art.

In operation, a presently preferred embodiment of the invention exemplifying suitable software for use with the present invention may be used as follows:

A user inserts the game cartridge 42 of remote control unit 41 (which houses the game's program and interface software) into the cartridge receptacle defined by back surface 30 of game player 100. The software preferably causes the LCD panel 2 on front surface 10 of game player 100 to display a Main Menu providing the user a pick list, for example, of three modes of play from which to select; namely, Direct Control, Program Route, or Load Route. The user preferably highlights one of the options by, for example, pressing the cruciform key 3, or any other suitable key in the operating portion 11 of front surface 10, to highlight the option and then pressing another suitable key responsible for indicating that the highlighted entry is being selected.

If the "Direct Control" Mode is selected, the software should serve to allow user entered commands to be immediately broadcast to the car unit 50 as described herein. Also, in this mode, the software generates and displays a simulated dashboard and/or windshield of a car on the LCD panel 3 that changes to simulate an actual driving experience as the game develops in response to the user's commands.

In this mode, the software provides real-time remote operation of the car unit 50. Using the operating portion 11 of front surface 10 of game player 100, the user enters keystrokes which the software translates into commands that are immediately broadcast by the transmitter unit 43 of the remote control unit 7 via antenna 44 to the antenna 71 of the receiver. The commands are then communicated by receiver unit 70 to control power unit 61, the motor 63, the steering mechanism 64, and any other peripheral or mechanized units remotely controllable according to the invention.

In addition, the software generates a corresponding display on LCD panel 2 to reflect the commands and movements of the car. For example, the dash displays relative speeds and directions and the windshield changes scenery and relative motion thereof corresponding to such changes.

According to a preferred embodiment, the software translates manipulation of the keys of the operating portion 11 of front surface as follows: the cruciform key 3 allows the user to command the steering mechanism 64 to pivot the front wheels 54 in the left or right direction so long as, and for as long as, the appropriate side of the key is pressed by the user. In an alternative embodiment, the cruciform key also allows the user to manipulate the speed of the car unit. For example, if the top of cruciform key is activated, the software may instruct the power unit to increase the speed of the motor 63 turning the axles 57 which rotate rear wheels 54.

In accordance with a presently preferred embodiment, the A and B buttons 4a, 4b control the direction the car travels. According to this embodiment, as long as the A button is pressed, the software translates instructions to the motor 63 to rotate axles 57 in the forward direction together with rear wheels 54. However, once the A button is released, the software stops instructing the motor 63 to turn the axles 57, thereby bringing the car to a halt. According to a presently preferred embodiment, when the A button is pressed, the car unit will only start to more gradually, and then progressively gain speed until some predetermined top speed is reached. Gradual acceleration simulates real life start-up and accelerating conditions, and provides the user with a better opportunity to effectively maneuver the car.

According to this embodiment, when the B button is pressed, the software causes the motor 63 to rotate the axles 57 in the reverse direction, thereby rotating the rear wheels 54 and moving the car in reverse.

Also, according to this embodiment, the two switch keys 5A, 5B support additional, programable functions. One of the keys preferably allows the user to stop and/or exit the "Direct Control" Mode. The other key may be programmed to control other aspects of the game. For example, in a presently preferred embodiment, the key acts as a toggle switch allowing the user to turn the headlights and/or taillights on and off. As will be appreciated by one of ordinary skill in the art, the key can be set up to correspond to, or control, an alternative command or function. Likewise, as will be appreciated by one of ordinary skill in the art, the sound function, LCD display, and keys may be utilized by the software for a wide variety of controls, commands, uses or functions.

In accordance with the invention, if the "Program Route" Mode is selected from the Main Menu, the software allows user entered commands to be stored and broadcast to the car unit 50 at a later time as described herein. An alternative feature allows the "Program Route" mode to be activated in the "Direct Control" mode to record input commands for later playback, editing, and storage. Also, in this mode, the software selectively generates a display on the LCD panel 3 which aids the user in constructing and saving a suitable route.

In this mode, the software preferably provides a series of options through which a user can navigate to construct a preferred route or routes, which can be accessed and transmitted to the car unit at a later time.

In a presently preferred embodiment, when this mode is selected from Main Menu, the software displays a series of options on LCD panel; namely, (a) editing a program route, (b) testing the programmed route, (c) scaling the programmed route, (d) saving the programmed route, (3) loading a programmed route, and (f) exiting the programming menu.

If the "editing a route" option is selected, the software causes the LCD panel to display a grid of equal-sized boxes, with one of the boxes flashing as if a cursor. The grid of equal-sized boxes displayed on the LCD panel may be traversed by using the cruciform key to move the flashing cursor box in any direction. When moving the cursor, the user has the option of either "adding a route portion" or "deleting a route" portion. The add and delete options may be actuated by pressing the A or B buttons, respectively.

In accordance with a presently preferred embodiment, when the user selects the A button for the first time (to add a portion of the route), the box in which the cursor sat when the button was selected is displayed on the LCD panel as a flashing shaded box to indicate that this is the starting position for the route. In other words, when the car unit is finally instructed to follow the route, the pattern it follows begins at the starting box.

Once the starting position has been selected, the cursor may be moved to any of the adjacent boxes to add the next portion of the route. In accordance with a presently preferred embodiment of the invention, one of the adjacent boxes must be selected in order to assure a continuous route. As additional boxes are added to the route, the route will be displayed on the LCD panel as a series of contiguous shaded boxes forming a pattern, or route, on the LCD panels grid. The display may automatically scroll as boxes are selected approaching an edge of the display or map to avoid going "off-screen."

In accordance with this embodiment, the user may edit the route by moving the cursor to one of the shaded boxes and pressing the B button, or the "delete a route" button, and moving the cursor to a different box and pressing the A button, or the "add a route portion" button. However, as will be appreciated by one of ordinary skill in the art, the route should at all times, or at least upon completion of editing, remain continuous in order for the car unit to complete the programmed route when commanded to do so.

In operation, the cursor is moved to the desired starting position and the "add a route" button is actuated. A flashing shaded box displays that this is the starting position of the route. Thereafter, when any of the continuous boxes are selected to be added to the route, the corresponding box will be shaded or bolded when the "add a route" portion button is pressed. Then, the adjacent boxes will be displayed as a series of empty but highlighted boxes indicating that these boxes, and only these boxes, may be selected by the user for the next portion of the route. Once the user has completed the desired route, the exit button on front face of host unit may be actuated to exit the "edit a route" option. The edit function may also provide various tools for constructing a new or editing an existing route. These tools may include a suite of prestored route elements such as "U-turns", S turns, accelerating and decelerating turns, etc.; a curve smoothing function may be used to reduce or eliminate course irregularities, etc.

In accordance with a presently preferred embodiment, when the "testing the programmed route" option is selected, the user's route may be tested to confirm that it can be successfully navigated under certain specified conditions, e.g., speed, acceleration, traction, etc. During testing, the software preferably does not allow the user to input or alter the route with the exception that a single button, such as the B button, allows the user to stop the testing immediately. Testing allows the user to view the car unit's progress with respect to the route before it is saved in the game's memory in order to allow the user to edit the route as necessary to confirm the car unit's probable successful completion of the route. In accordance with this embodiment, when the testing is finished, the user is able to press the "select" button, or any other suitable button, to exit the testing option. The testing option may include actual traversal of the tentative route and transmission of steering and speed commands to the car unit 50 or simulated traversal of the course using a software model specific to the car unit with predicted progress and position displayed. Deviation from the desired course may be appropriately indicated so that the course or command sequence may be adjusted.

In accordance with a presently preferred embodiment, when the "scaling of the programmed route" option is selected, the software allows the user to alter the size or scale of the route. In accordance with this aspect of the invention, the area traversed by a single box in the LCD panel's grid equates to a certain distance the car unit will travel. Accordingly, scaling the route allows the user to increase or decrease the distance box. In a presently preferred embodiment, when this option is selected, the current scale value is indicated on the LCD panel, e.g., "each grid box equals 1 foot", etc. Accordingly, the user is able to scale the value as desired in view of the reference value. For example, the user may press the cruciform key in an up direction to increase the scale value, or press the cruciform key in a down direction to decrease the scale value. Once the desired scale value is selected, the car unit should follow the route according to the new scale. Preferably, once the preprogrammed route is scaled to the desired value, the route may be saved at the scale value in the game's memory.

In a presently preferred embodiment, when the "saving a preprogrammed route" option is selected, the software allows a user to save and name the preprogrammed route. As will be appreciated by one of ordinary skill in the art, allowing a user to save the route under a user-identified name (alphanumeric or otherwise) allows the user to select the route at a later time on the basis of the user-identified name.

Accordingly, in a presently preferred embodiment, when the "opening of a preprogrammed route" option is selected, the user may open one of the saved routes by entering, or picking off a pick list, the correct user-identified name which was entered during the save option.

Also, in accordance with a presently preferred embodiment, an "exiting the preprogramming menu" option allows the user to exit the "Program Route" Mode. Preferably, the software allows the user to return to the Main Menu when the exiting option is selected.

In accordance with the invention, if "Load Route" Mode is selected from the Main Menu, the software allows a stored route to be retrieved and broadcast to the car unit 50 as described herein. Also, in this mode, the software generates the route on the LCD panel 3 and allows a user to view the predicted progress of the car unit as it follows the route.

In a presently preferred embodiment, when the "Load Route" mode is selected from the Main Menu, the software displays a list of preprogrammed or saved routes from which the user may select a desired preprogrammed route to be followed by the car unit. In accordance with this embodiment, the user makes a selection by moving a highlighted bar over the desired file name by use of the cruciform key, or other appropriate key, and then pressing the A button, or any other appropriate button, to select the route to be loaded. When the route is selected, the software displays the route pattern on the LCD panel as a series of contiguous shaded boxes with one box, the start position, flashing. Thereafter, when the user presses the start button, the car unit starts following the route until a stop button is pressed or the route is completed. Alternatively, the car unit could be instructed to follow a closed route repeatedly, until instructed otherwise. In a presently preferred embodiment, the A button will start the route, the B button will stop the route, and the select button will exit the "Load Route" Mode.

Preferably, the software allows a user to view and monitor the car unit's progress with respect to the route by flashing or changing the color of the cursor in the appropriate box of the route which corresponds to the position of the car unit. In a presently preferred embodiment, the cursor is positioned and moves in response to the progress of the car based on quantifiable factors such as the speed of the toy vehicle and the length of the route portion to be traversed. However, as will be appreciated by one of ordinary skill in the art, the car's progress around the route may be tracked by other suitable means (e.g., sensors in and/or along the route of travel, etc.).

Also, as will be appreciated by one of ordinary skill in the art, there are numerous variations and modifications to the software described above that may be incorporated without departing from the spirit and scope of the present invention. Accordingly, as will be appreciated by one of ordinary skill in the art, once armed with Applicant's specification, the development of the software suitable for carrying out the scope and spirit in the intended invention is well within the ability of one of ordinary skill in the art.

Figure 6:
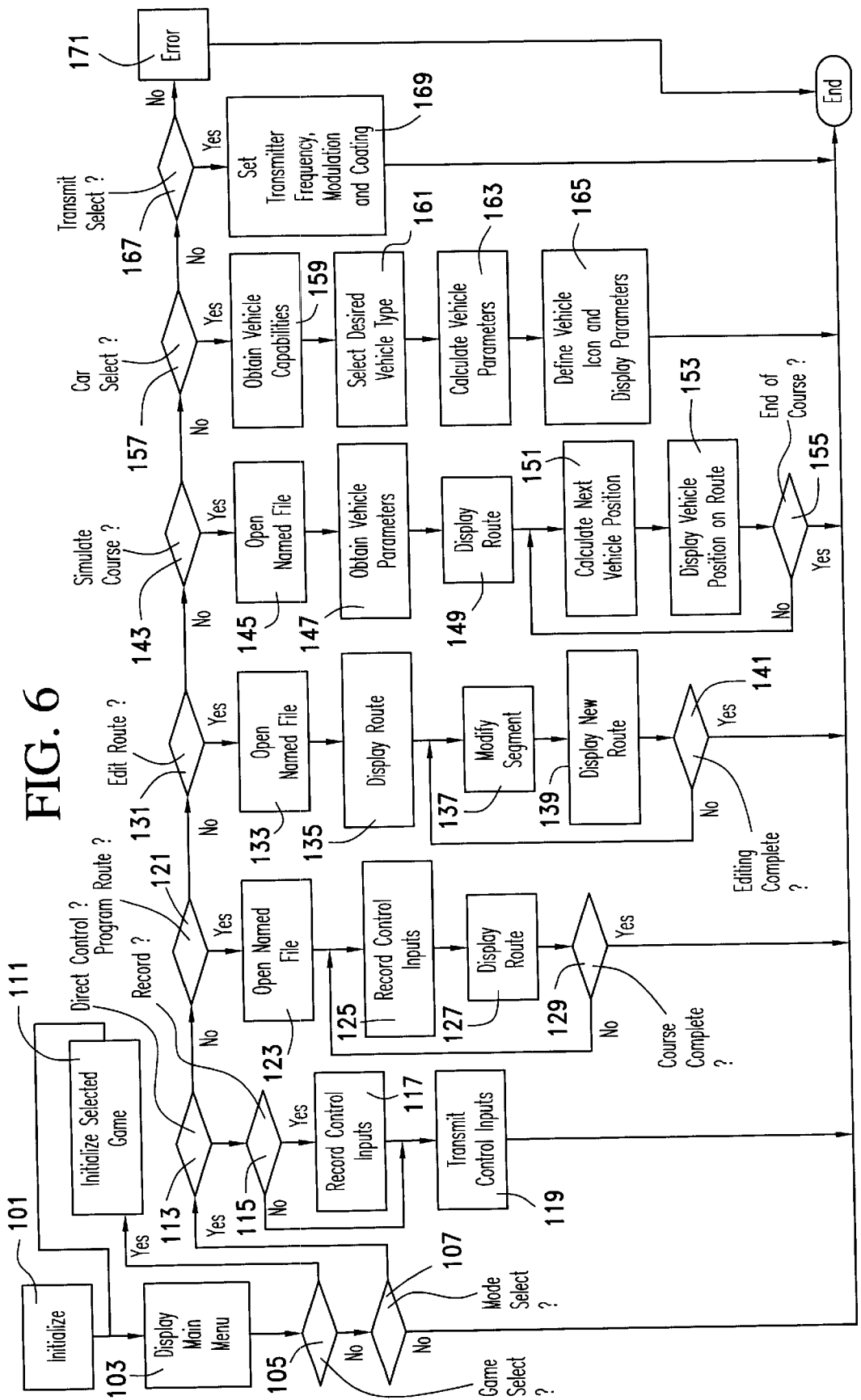
FIG. 6 is a flow diagram of a method of operating a remote control vehicle according to the invention.

FIG. 6 is a logic flow diagram of a program according to another embodiment of the invention for controlling a remote vehicle (such as a miniature car) as might be executed by a microprocessor of game player 100 in response to program instructions stored in game cartridge 42 of remote control unit 7. At step 101, the process is initialized including initialization of the microprocessor and loading and execution of any operating system. At step 103 a main menu is displayed to provide for any required user inputs to select a function including, for example, selection of a game or games stored in game cartridge 42. Accordingly, the user may select a game at step 105, the selected game being initialized at step 111 to then display the appropriate main menu according to the then installed game.

If the user has instead selected a game mode at step 107, then the appropriate mode is executed in response to respective branches 113, 121, 131, etc. Thus, if the user elects to directly control the vehicle at step 113, then processing continues at 115 to provide the user with the option of recording either the control inputs to be used or other data allowing replay of a course or route of travel defined by such actions. If a record option has been selected, then processing continues at step 117 to record the control inputs and, at step 119 to transmit the control inputs to the remotely controlled vehicle in real time. If the record option is not selected, then flow bypasses record step 117.

If a user selects to program a route at step 121, an appropriate file is opened at 123 to record control input at step 125. The file may be opened based on a name input by the user, a select list, or a default name may be used. At step 127 a route resulting from the control inputs is displayed at step 127. At branch 129, the user may manually designate the completion of a route or appropriate logic may be initiated to otherwise signal completion of a route, e.g, completion of a circuit back to the initial starting point. An override function may be implemented to continue a route beyond completion of an initial circuit as might be necessary, for example, to describe and implement a figure "8" course of travel or other routes having crossing or overlapping paths.

Editing capabilities are provided beginning at branch 131. Thus, at 131 the indicated file a user specified is opened and the corresponding route resulting from the file or described by or resulting from control inputs described by the file is displayed. The user can modify segments of the route at 137. Such modification may include redefining the segment, deleting or inserting a segment, etc. At step 139 the new route is displayed. Further modification of the route is accomplished by looping back from branch 141 to step 137. Upon completion of the editing process, flow is transferred to "end" terminal 109.

Course simulation is initiated at 143, with the file corresponding to the desired route to be simulated opened at 145. Appropriate vehicle parameters are obtained at 147. This may include pre-stored parameters or may allow the user to input or override parameters. At step 149 the route to be followed by the simulated vehicle is displayed. An iterative process of calculating vehicle position is initiated at step 151 where the next incremental vehicle position is calculated and, at step 153 displayed with reference to the route. This loop continues from step 155 back to 151 until the vehicle reaches the end of the course. Typically, the end of course will be associated with the end of the route. However, alternative conditions may be defined such as calculation of a vehicle position substantially off the desired route, predicted vehicle impairment (e.g., accident, etc.), manual termination of the simulation, etc.

A car selection mode is encountered at 157 to allow a user to input parameters and characteristics of the physical device being used and to define desired operating constraints. Thus, at step 159, vehicle capabilities are provided, either in connection with pre-stored make and model of vehicle or as manually input. These capabilities may be defined by parameters such as acceleration and deceleration curves, coefficients defining traction limitations of the vehicle in connection with the track surface to be used, etc. At step 161 the user may select a desired vehicle type, preferably corresponding to any shell or consistent with other physical appearance of the remote utility vehicle. For example, a truck version of a vehicle may further limit acceleration capabilities of a vehicle to better simulate that type of vehicle. At step 163 the vehicle capabilities and type result in calculation of vehicle parameters to be used by, for example, a simulation or in simulating an appropriate acceleration/deceleration parameters for the vehicle. At step 165 an appropriate vehicle icon is selected corresponding to the selected vehicle type (e.g., sport car, monster truck, etc.) and the corresponding vehicle parameters are displayed.

A transmit select mode is provided at step 167, wherein the user may select parameters and characteristics to be used by the transmitter including, for example, transmitter frequency, modulation type, and data coding and protocol.

For the purposes of the subject illustration, failure to select one of the available modes is processed as an error condition in 171, logic flow being transferred to end terminal 109.

Figure 7:
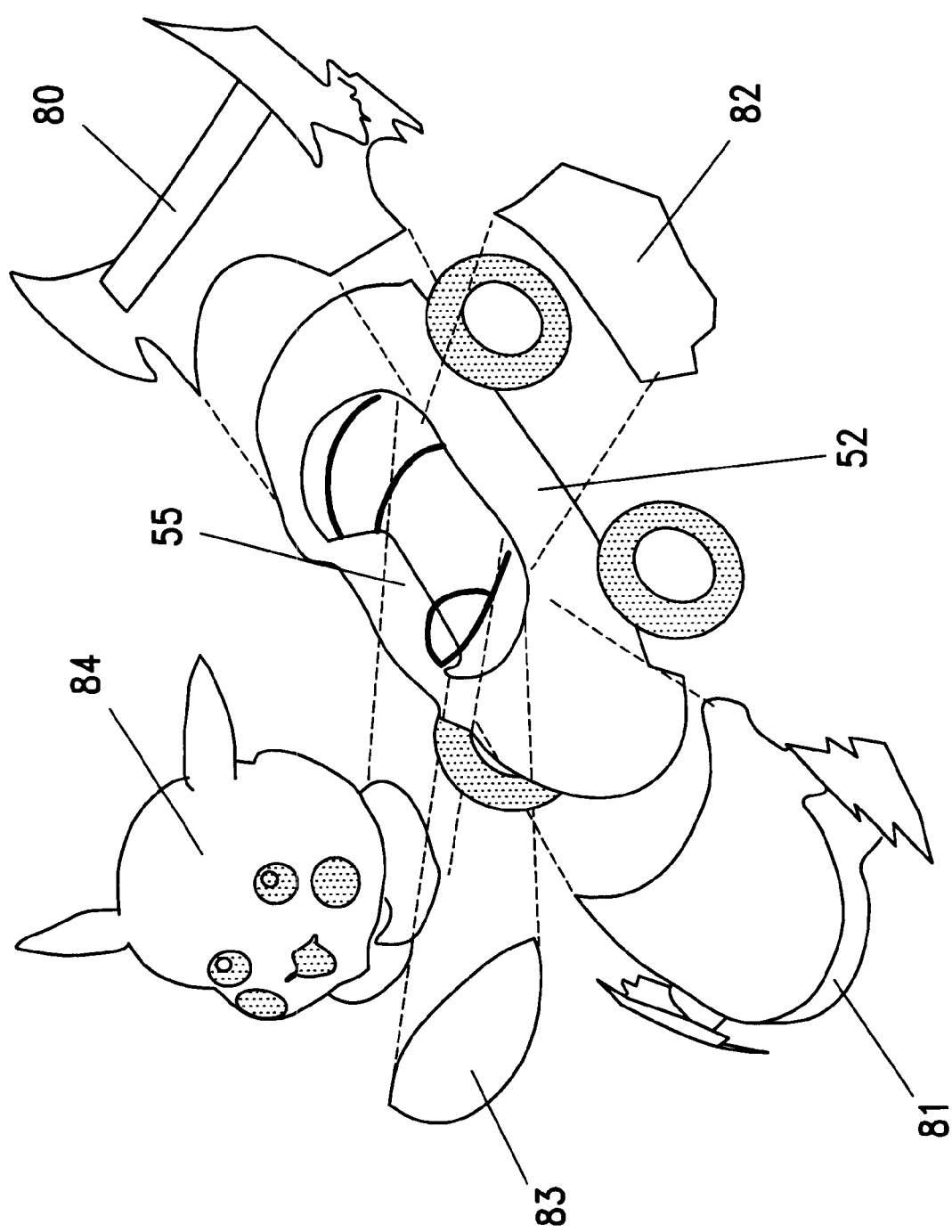
FIG. 7 is a partially exploded view of an embodiment of a car unit of an RC car device according to the invention.

FIG. 7 depicts a miniature car 51 embodying another aspect of the invention. As will be appreciated by one of ordinary skill in the art, the miniature car described herein, and numerous variations thereof, are suitable for use with any and all of the aforementioned aspects and features of the invention, and any and all modifications and variations thereof.

As depicted in FIG. 7, the miniature car 51 may make use of interchangeable body work or shell. FIGS. 5A and 5B showed an embodiment wherein the car frame 52 was coupled with a body casing 55 which in and of itself defines the configuration of the car's body. FIG. 7 shows an alternative use of interchangeable body work wherein individualized body parts are coupled with the frame, or a body casing or shell. In this embodiment, the frame 52 has a body shell 55 capable of receiving interchangeable body parts. As will be appreciated by one of ordinary skill in the art, interchangeable body parts allows the design and configuration of the car to be changed by manipulating the body parts. In the embodiment depicted in FIG. 7, a Pokemon® character car is shown as an exploded view. The body parts comprise a tail or rear spoiler portion 80, a front portion 81, a side panel 82, a windshield 83 and a character head portion 84. As will be readily apparent to one of ordinary skill in the art, by changing any of the body parts, the look and feel of the car can be dramatically altered. Thus, as will be appreciated by one of ordinary skill in the art, the ease of altering the toy's body design lessens the happenstance that the user will lose interest in playing with the car unit if it goes out of style. Also, the user may purchase new body parts to alter the appearance of the car to suit changing tastes or interests. Furthermore, interchangeable body parts may attract a user to begin a collection, for example, of specialized vehicles, which helps maintain the user's interest in playing with the toy and increases the sales of peripheral goods in connection with the RC toy car, or any RC toy device.

While this invention has been described with an emphasis upon the preferred embodiments, variations and modifications to the invention should now be apparent to one of ordinary skill in the art. These variations and modifications are intended to fall within the scope and spirit of the invention as defined by the following claims.

What is claimed is:

1. A remote control (RC) toy device comprising:
    a self-powered RC toy unit comprising a toy body, a wireless radio frequency (RF) receiver for receiving commands from a remote wireless transmitter, and a power unit for power the toy unit; and
    a handheld RC control unit comprising (i) a controller adapted for receiving a user's commands, and (ii) a removable game cartridge comprising (a) a main body comprising said wireless transmitter, and (b) a cassette portion containing software for interfacing said controller and said wireless transmitter.

2. The RC toy device of claim 1, wherein said controller has a liquid crystal display (LCD) panel.

3. The RC toy device of claim 2, wherein said controller comprises a handheld game player.

4. The RC toy device of claim 3, wherein said game player is adapted for receiving interchangeable game cartridges.

5. The RC toy device of claim 2, wherein said game player includes an LCD panel configured to display developments of a game.

6. The RC toy device of claim 5, wherein said toy body comprises a miniature car.

7. The RC toy device of claim 6, wherein said miniature car comprises a car frame having wheels coupled thereto.

8. The RC toy device of claim 7, wherein said miniature car is adapted for receiving interchangeable body work.

9. The RC toy device of claim 8, wherein said interchangeable body work is interchangeable body casings.

10. The RC toy device of claim 8, wherein said interchangeable body work is interchangeable body parts.

11. A remote control (RC) toy car comprising:
   a car unit comprising a miniature car, a power unit for powering the car unit, and receiver unit for receiving commands from a transmitter; and
   a control unit comprising a handheld game player adapted for receiving interchangeable game cartridges and adapted for displaying development of a game on a display and a game cartridge comprising a main body portion housing said transmitter and a game cartridge housing software adapted for allowing said controller to serve as a remote game player of said car unit.

12. The RC toy car of claim 11, wherein said control unit provides a user with direct control of said car unit.

13. The RC toy car of claim 11, wherein said control unit provides a user with preprogrammable control of said car unit.

14. The RC toy car of claim 11, wherein said control unit provides a user with alternative control of said car unit.

15. The RC toy car of claim 14, wherein alternative control provides a user with the option of direct control or preprogrammed control of said car unit.

16. The RC toy car of claim 11, wherein said display configured to simulate a car's dashboard when said car unit is being remotely controlled by said control unit.

17. The RC toy car of claim 11, wherein said display is configured to display a preprogrammed route which the car unit may be motivated to follow by said control unit.

18. The RC toy car of claim 11, wherein said software causes to be displayed on said display a pick list of modes of play a user may select from.

19. The RC toy car of claim 18, wherein said pick list comprises direct control, program route, and load route.

20. The RC toy car of claim 19, wherein selection of direct control allows a user to enter commands which are immediately broadcast to the car unit.

21. The RC toy car of claim 19, wherein selection of program route allows a user to enter a route and save said route in a memory of the control unit, whereby the control unit may broadcast the route commands to said car unit at a later time.

22. The RC toy car of claim 19, wherein selection of program route allows a user to select an option from a pick list exhibiting at least one of editing a route, testing a route, scaling a route, saving a route, loading a route, or exiting the program menu.

23. The RC toy car of claim 19, wherein selection of load route allows a user to select a preprogrammed route from a pick list of routes saved in a memory of the control unit.

24. The RC toy car of claim 11, wherein said miniature car is adapted to receive interchangeable body work.

25. The RC toy car of claim 24, wherein said interchangeable body work comprises interchangeable body casings.

26. The RC toy car of claim 24, wherein said interchangeable body work comprises interchangeable body parts.

27. A hand-held electronic game machine, comprising:
   a case adapted to be handheld;
   first and second switches disposed on a front surface of said case and configured to be operated by a player's left and right thumbs, respectively, while holding said case;
   a display panel disposed on said front surface of said case;
   a docking port formed on an upper side surface of said case;
   an external game cartridge insertable into said docking port, said external game cartridge including (i) and external memory storing a game program configured to display game images on said display screen, and (ii) a transmitter configured to transmit commands generated by said game program to a remote platform;
   a processor housed in said case, said processor connected to said external memory via said docking port and configured to execute said game program; and
   a memory housed in said case and associated with said processor for storing background character data and moving object character data read from said external memory by said processor.

28. The handheld electronic game machine according to claim 1 wherein said external memory and said transmitter each include respective mating electrical connectors configured to couple a signal between said transmitter to said external memory.

29. A game player system comprising:
   a handheld game player having a game cartridge receptical; and
   a remote control unit including
      (i) a game cartridge configured to interface with said handheld game player via said game cartridge receptical, said game cartridge having stored therein program code readable and executable by said handheld game player, and
      (ii) a transmitter physically attached to said game cartridge and configured to transmit control data generated by said handheld game player.

30. The game player system according to claim 29, wherein said transmitter is configured to wirelessly transmit said control data to a remote wireless receiver.

31. The game player according to claim 29 further comprising a housing to which said game cartridge and transmitter are commonly mounted.

32. The game player according to claim 29 wherein said game cartridge and said transmitter are in intimate mechanical contact.

* * * * *